(12) United States Patent
Kamiya et al.

(10) Patent No.: US 11,396,289 B2
(45) Date of Patent: Jul. 26, 2022

(54) BRAKING ASSISTANCE DEVICE AND BRAKING ASSISTANCE METHOD FOR VEHICLE

(71) Applicant: DENSO CORPORATION, Kariya (JP)

(72) Inventors: Kei Kamiya, Kariya (JP); Yosuke Ito, Kariya (JP); Takaharu Oguri, Kariya (JP); Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 16/438,800

(22) Filed: Jun. 12, 2019

(65) Prior Publication Data

US 2019/0291729 A1    Sep. 26, 2019

Related U.S. Application Data

(63) Continuation of application No. PCT/JP2017/044751, filed on Dec. 13, 2017.

(30) Foreign Application Priority Data

Dec. 14, 2016 (JP) .............................. JP2016-242117

(51) Int. Cl.
*B60W 30/09* (2012.01)
*B60T 7/12* (2006.01)
(Continued)

(52) U.S. Cl.
CPC ............... *B60W 30/09* (2013.01); *B60T 7/12* (2013.01); *B60W 10/18* (2013.01);
(Continued)

(58) Field of Classification Search
CPC .. B60W 30/09; B60W 10/18; B60W 30/0956; B60W 40/04; B60W 2420/42;
(Continued)

(56) References Cited

U.S. PATENT DOCUMENTS

| 2014/0039786 A1* | 2/2014 | Schleicher | ............ | B60W 30/09 |
| | | | | 701/301 |
| 2015/0148985 A1* | 5/2015 | Jo | .......................... | B60W 50/16 |
| | | | | 701/1 |

(Continued)

FOREIGN PATENT DOCUMENTS

| JP | 2010-280271 | 12/2010 |
| JP | 2013-86782 A | 5/2013 |

(Continued)

*Primary Examiner* — Nicholas Kiswanto
*Assistant Examiner* — Jamal A Shah
(74) *Attorney, Agent, or Firm* — Maschoff Brennan

(57) ABSTRACT

A braking assistance device for a vehicle includes an object sensing unit for sensing an object, an intersection entry determination unit for determining entry of a host vehicle into an intersection, and a braking assistance execution unit for executing braking assistance by a braking device so as to avoid or mitigate collision with the object. If the host vehicle is determined to be entering the intersection, the braking assistance execution unit determines, based on a sensing result from the object sensing unit, a traffic environment at the intersection, and controls execution of the braking assistance in accordance with the determined traffic environment.

9 Claims, 8 Drawing Sheets

(51) Int. Cl.
  *B60W 10/18* (2012.01)
  *B60W 30/095* (2012.01)
  *B60W 40/04* (2006.01)

(52) U.S. Cl.
  CPC ........ *B60W 30/0956* (2013.01); *B60W 40/04* (2013.01); *B60T 2201/022* (2013.01); *B60W 2420/42* (2013.01); *B60W 2520/14* (2013.01); *B60W 2520/28* (2013.01)

(58) Field of Classification Search
  CPC . B60W 2520/14; B60W 2520/28; B60T 7/12; B60T 2201/022
  See application file for complete search history.

(56) References Cited

U.S. PATENT DOCUMENTS

| | | |
|---|---|---|
| 2016/0193999 A1 | 7/2016 | Sasabuchi |
| 2017/0072950 A1* | 3/2017 | Sim .................... B60W 10/184 |
| 2017/0113683 A1* | 4/2017 | Mudalige ........ B60W 30/18145 |
| 2017/0305419 A1* | 10/2017 | Liebinger Portela . B60W 30/08 |

FOREIGN PATENT DOCUMENTS

| | | |
|---|---|---|
| JP | 5565303 B2 | 8/2014 |
| WO | 2016/104198 A1 | 6/2016 |

\* cited by examiner

BRAKING ASSISTANCE DEVICE AND BRAKING ASSISTANCE METHOD FOR VEHICLE

CROSS-REFERENCE TO RELATED APPLICATION

The present application claims priority based on Japanese Patent Application No. 2016-242117, filed on Dec. 14, 2016, the contents of which are incorporated herein by reference in its entirety.

BACKGROUND

Technical Field

The present disclosure relates to a braking assistance device for a vehicle and a braking assistance method for a vehicle.

Background Art

Using a sensing result from an object sensing device such as a camera or a radar to execute braking assistance, and decelerate or stop a host vehicle. Examples of the braking assistance include braking assistance for avoiding collision with a preceding or oncoming vehicle, or braking assistance in accordance with a red light of a signal light.

SUMMARY

The present disclosure provides a braking assistance device for a vehicle. The braking assistance device for the vehicle according to the first aspect includes an object sensing unit that senses an object, an intersection entry determination unit that determines entry of a host vehicle into an intersection, and a braking assistance execution unit that: executes braking assistance using a braking device so as to avoid or mitigate collision with the object; determines, based on a sensing result from the object sensing unit, a traffic environment at the intersection if the host vehicle is determined to be entering the intersection; and controls execution of the braking assistance in accordance with the determined traffic environment.

BRIEF DESCRIPTION OF THE DRAWINGS

With the following detailed description and the attached drawings, the present disclosure will more fully be understood.

DETAILED DESCRIPTION OF THE PREFERRED EMBODIMENTS

Figure 1:
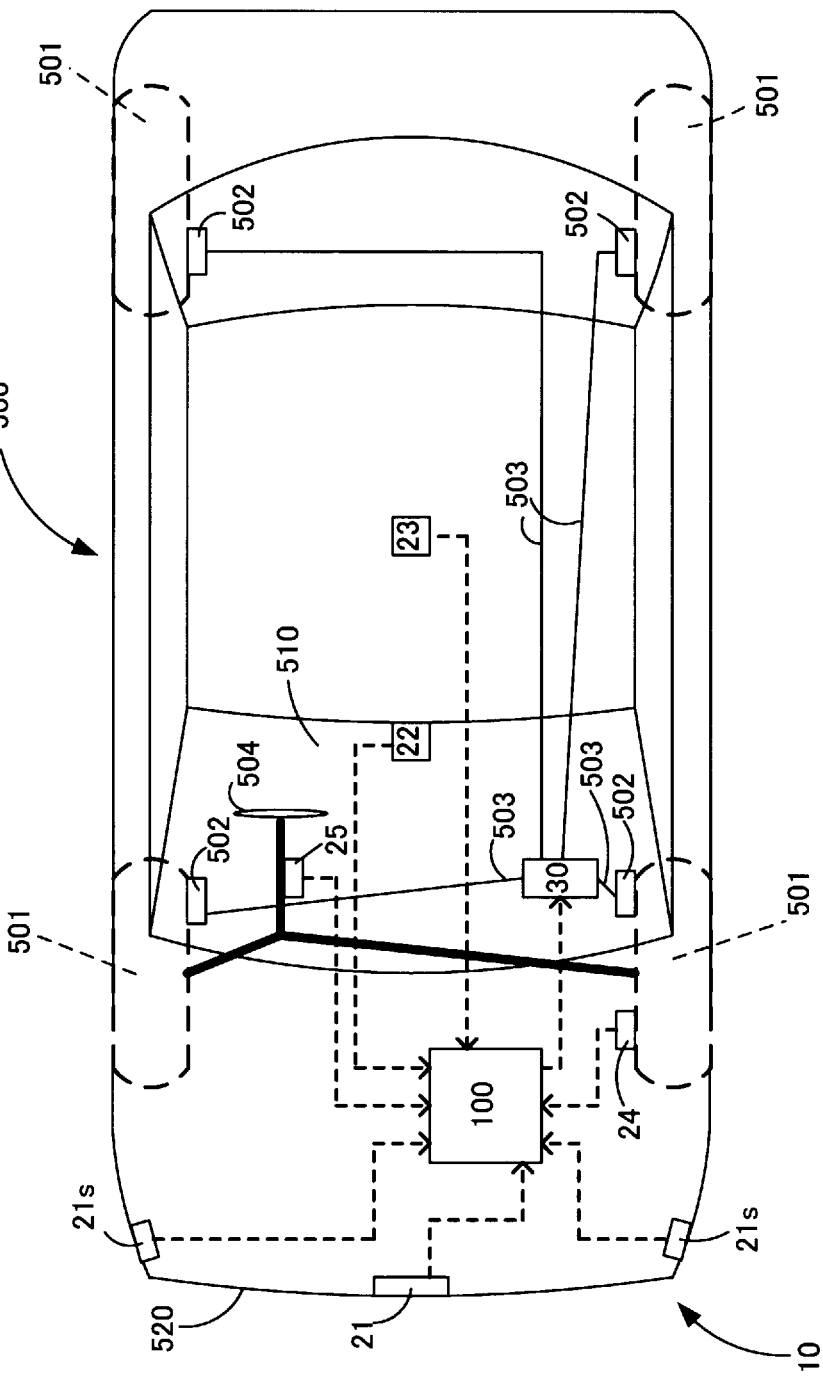
FIG. 1 is an explanatory diagram showing a vehicle on which a braking assistance device according to a first embodiment is mounted.

The present disclosure particularly relates to a technology of controlling braking assistance at an intersection.

Technologies of braking assist, that impart supplementary braking force in accordance with a driving environment of a vehicle, in addition to a braking operation by an operator, have been put to a practical use.

The execution of braking assistance, however, may invite collision with another vehicle instead, depending on a traffic environment. For example, if a host vehicle is in an intersection, execution of braking assistance to decelerate or stop the host vehicle may invite collision with another vehicle. Therefore, in execution of braking assistance at an intersection, a technology for avoiding or mitigating collision of a host vehicle with another vehicle accompanied by the braking assistance, has been desired.

The present disclosure can be implemented as the following aspects.

A first aspect provides a braking assistance device for a vehicle. The braking assistance device for the vehicle according to the first aspect includes an object sensing unit that senses an object, an intersection entry determination unit that determines entry of a host vehicle into an intersection, and a braking assistance execution unit that: executes braking assistance using a braking device so as to avoid or mitigate collision with the object; determines, based on a sensing result from the object sensing unit, a traffic environment at the intersection if the host vehicle is determined to be entering the intersection; and controls execution of the braking assistance in accordance with the determined traffic environment.

The braking assistance device for the vehicle according to the first aspect, can avoid or mitigate collision of the host vehicle with another vehicle, accompanied by the braking assistance, in execution of the braking assistance at the intersection.

A second aspect provides a braking assistance method for a vehicle. The braking assistance method for the vehicle according to the second aspect includes determining entry of a host vehicle into an intersection; determining, based on a sensing result from an object, a traffic environment at the intersection if the host vehicle is determined to be entering the intersection; and controlling braking assistance executed by a braking device, so as to avoid or mitigate collision with the object, in accordance with the sensing result and the determined traffic environment.

The braking assistance method for the vehicle according to the second aspect can avoid or mitigate collision of the host vehicle with another vehicle, accompanied by the braking assistance, in execution of the braking assistance at the intersection. Notably, the present disclosure can also be implemented as a braking assistance program for a vehicle, or a computer readable recording medium that records the program.

Based on some embodiments, hereinafter will be described a braking assistance device for a vehicle and a braking assistance method for a vehicle according to the present disclosure.

First Embodiment

As shown in FIG. 1, a braking assistance device 10 according to a first embodiment is mounted on a vehicle 500 and used. The braking assistance device 10 includes a control device 100, millimeter wave radars 21, 21s, a monocular camera 22, a yaw rate sensor 23, a wheel velocity sensor 24, a steering angle sensor 25, and a braking assistance actuator 30. Notably, the braking assistance device 10 may include only the control device 100, and if including the millimeter wave radars 21, 21s, the monocular camera 22, the yaw rate sensor 23, the wheel velocity sensor 24, the steering angle sensor 25, and the braking assistance actuator 30, the braking assistance device 10 may be called a braking assistance system. The vehicle 500 includes wheels 501, braking devices 502, braking lines 503, a steering wheel 504, a windshield 510, and a front bumper 520. Notably, the vehicle only needs to include, as an object sensing unit, at least one of the millimeter wave radars 21, 21s, the monocular camera 22, and a LIDAR, i.e., a laser radar. In the present embodiment, the millimeter radars 21, 21s and the monocular camera 22 are included as the object sensing unit.

In the vehicle 500, each of the braking devices 502 is provided at the corresponding one of the wheels 501. Each of the braking devices 502 implement braking of the corresponding one of the wheels 501 by brake fluid pressure supplied via the braking lines 503 in accordance with a braking pedal operation by an operator. Each braking line 503 includes a brake piston that derives brake fluid pressure in accordance with a braking pedal operation, and a brake fluid line. In the present embodiment, the braking assistance actuator 30 is provided for the braking lines 503, and can control fluid pressure independently of a braking pedal operation, thereby implementing braking assistance. Notably, each braking line 503 may be configured such that the brake fluid line is replaced by a control signal line and an actuator provided at the corresponding one of the braking devices 502 is operated. The steering wheel 504 is connected to the front wheels 501 via a steering rod and a steering mechanism.

Figure 2:
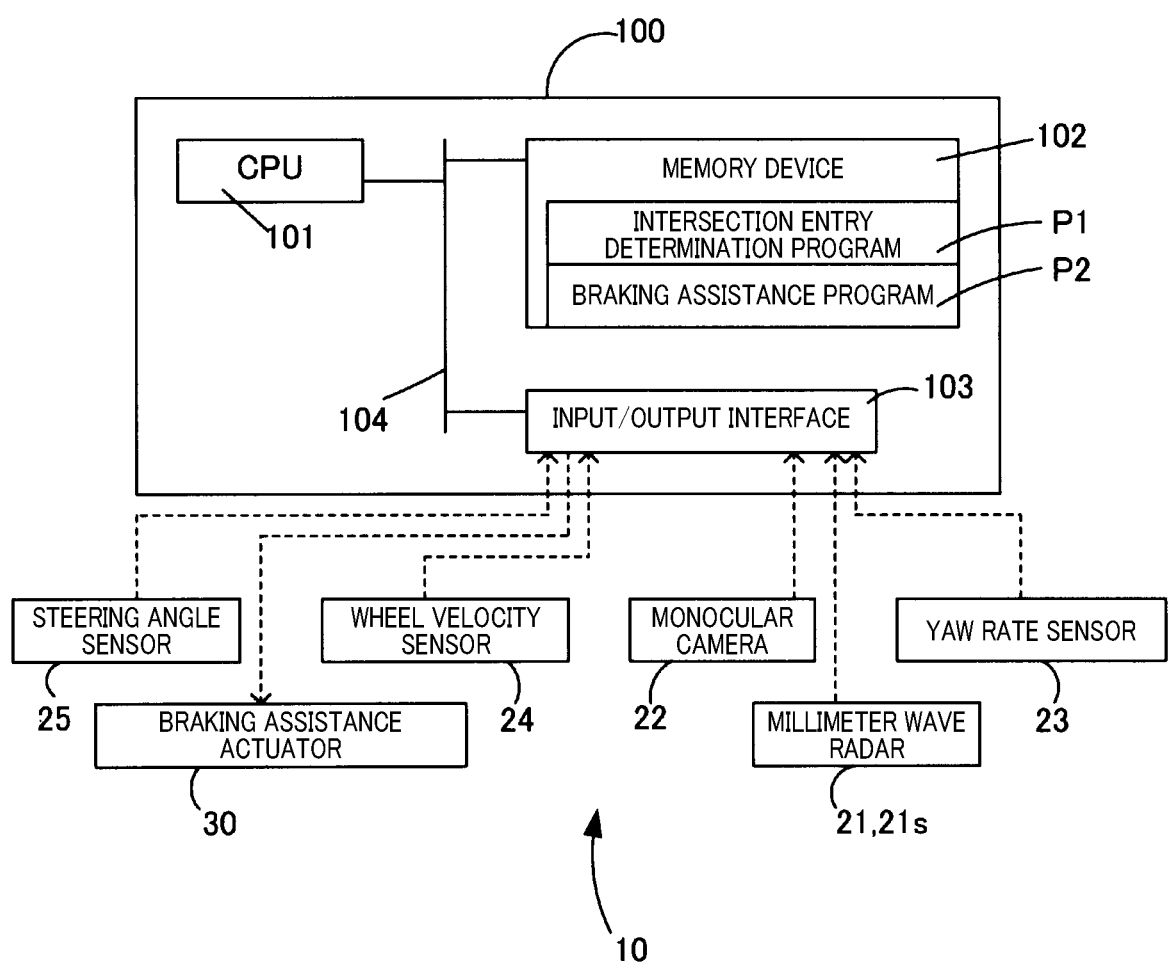
FIG. 2 is a block diagram showing a functional configuration of a control device included in the braking assistance device according to the first embodiment.

As shown in FIG. 2, the control device 100 includes a central processing unit (CPU) 101, a memory device 102, an input/output interface 103, and a bus 104. The CPU 101, the memory 102, and the input/output interface 103 are connected via the bus such that they can bidirectionally communicate with each other. The memory device 102 includes a memory that stores an intersection entry determination program 10 and a braking assistance program P2 in a nonvolatile and read-only manner, an example of which is a ROM, and a memory that is readable/writable by the CPU 101, an example of which is a RAM.

The intersection entry determination program P1 is for determining entry and/or departure of the vehicle 500 into and/or from intersections, and the braking assistance program P2 is for assisting braking by the braking devices 502. The CPU 101 decompresses and executes the intersection entry determination program P1, which is stored in the memory 102, in the readable/writable memory to thereby function as an intersection entry determination unit, and similarly, executes the braking assistance program P2 to thereby function as a braking assistance execution unit. Notably, the braking assistance execution unit also includes the braking assistance actuator 30 that receives a control signal from the CPU 101 and applies, to each braking line 503, fluid pressure for braking assistance. Moreover, the braking assistance execution unit can include a control unit implemented by the CPU 101, and a driving unit implemented by the braking assistance actuator 30. The control unit executes the braking assistance program P2 to control execution of braking assistance, thus transmitting a control signal to each actuator. The driving unit drives the braking devices 502 for braking assistance. The CPU 101 may be a single CPU, a plurality of CPUs that respectively execute the programs, or a multitask-type CPU that can simultaneously execute a plurality of programs.

Respectively connected to the input/output interface 103 via control signal lines are the millimeter wave radars 21, 21s, the monocular camera 22, the yaw rate sensor 23, the wheel velocity sensor 24, the steering angle sensor 25, and the braking assistance actuator 30. The input/output interface 103 receives inputs of sensing information from the millimeter wave radars 21, 21s, the monocular camera 22, the yaw rate sensor 23, the wheel velocity sensor 24, and the steering angle sensor 25, and outputs a control signal indicating a braking level to the braking assistance actuator 30.

Each of the millimeter wave radars 21, 21s is a sensor that emits millimeter waves and receives reflected waves reflected by an object, to thereby detect a location of and a distance from the object. In the present embodiment, the millimeter wave radar 21 is disposed at the center of the front bumper 520, and the two millimeter wave radars 21s are respectively disposed at opposite side surfaces of the front bumper 520. Each of the millimeter wave radars 21, 21s can include a processing circuit that can process received waves. A detection signal outputted from each of the millimeter wave radars 21, 21s may be, for example, a signal comprised of the sequence of dots obtained based on the processing of the received waves. Each of the dots indicates a representative location of an object. The detection signal may also be, for example, a signal that indicates unprocessed received waves. If unprocessed received waves are used as a detection signal, the control device 100 executes signal processing for specifying a location of and a distance from the object. Notably, the millimeter wave radars may be replaced by LIDARs.

The monocular camera 22, which is an imaging device that includes one imaging element such as a CCD, is a sensor that receives visible light to thereby output external shape information about an object as image data indicative of a sensing result. The image data outputted from the monocular camera 22 is comprised of a plurality of time-sequentially consecutive frame images, and each frame image is represented by pixel data. In the present embodiment, the monocular camera 22 is disposed at the upper center of the windshield 510. The pixel data outputted from the monocular camera 22 is monochrome or colored pixel data. Notably, the monocular camera 22 may be replaced by a compound-eye stereo camera.

The yaw rate sensor 23 is a sensor that detects a rotational angular velocity of the vehicle 500. The yaw rate sensor 23 is disposed, for example, at a central portion of the vehicle. A detection signal outputted from the yaw rate sensor 23 represents a voltage value proportional to a rotational direction and an angular velocity.

The wheel velocity sensor 24 is a sensor provided at each wheel 501, detecting a rotational velocity of the corresponding wheel 501. A detection signal outputted from each wheel velocity sensor 24 represents a voltage value proportional to a wheel velocity or a pulsed wave indicating intervals in accordance with the wheel velocity. With use of the detection signal from the wheel velocity sensor 24, information on a velocity of the vehicle, a travelling distance of the vehicle, and the like can be acquired.

The steering angle sensor 25 is a torque sensor that detects an amount of torsion that has occurred in the steering rod by steering of the steering wheel 504, i.e., steering torque. In the present embodiment, the steering angle sensor 25 is provided at the steering rod that connects the steering wheel 504 and the steering mechanism. A detection signal outputted from the steering angle sensor 25 represents a voltage value proportional to an amount of torsion.

The braking assistance actuator 30 is an actuator that causes the braking devices 502 to execute braking irrespective of a braking pedal operation by an operator. In the present embodiment, the braking assistance actuator 30 is provided at each braking line 503, and increases/decreases hydraulic pressure in each braking line 503 in accordance with a control signal from the control device 100. The braking assistance actuator 30 is comprised of, for example, a module that includes an electric motor and a hydraulic piston driven by the electric motor. Alternatively, the braking assistance actuator 30 may be comprised of a braking control actuator that has already been introduced as a sideslip prevention device or an antilock braking system.

Figure 3:
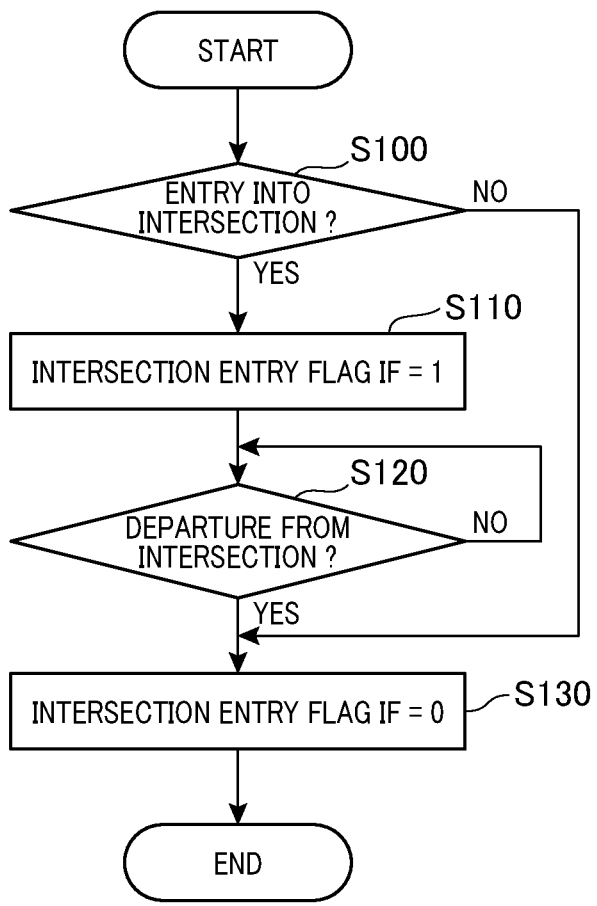
FIG. 3 is a flowchart showing a process flow of braking assistance at the time of entering an intersection, executed by the braking assistance device according to the first embodiment.

An intersection entry determination process executed by the braking assistance device 10 according to the first embodiment will be described hereinafter with reference to FIGS. 3 and 4. The CPU 101 executes the intersection entry determination program P1 to thereby repeatedly execute the processing routine shown in FIG. 3 at predetermined time intervals, for example, from startup to stop of a control system of the vehicle, or from turn-on to turn-off of a start switch.

The CPU 101 determines whether a host vehicle M1 is entering an intersection IS (step S100). The entry into the intersection IS can be determined using at least one of a shape of the intersection, the presence or absence of signal lights, road markings, road signs, and a traveling track of the host vehicle. The CPU 101 uses detection signals inputted from the millimeter wave radars 21, 21s to thereby recognize the shape of the intersection, and determines whether e host vehicle is in a state of being entering the intersection. Examples of the shape of the intersection include an end portion of a median strip, curb stones, each of which configures a step portion between a corresponding lane and a corresponding sidewalk, guardrails provided along the intersection, and/or guard pipes provided along the intersection. The CPU 101 can recognize the shape of the intersection, mentioned before, based on distribution characteristics of dot sequences each indicating an object shown by a detection signal inputted from the millimeter wave radar 21.

Figure 4:
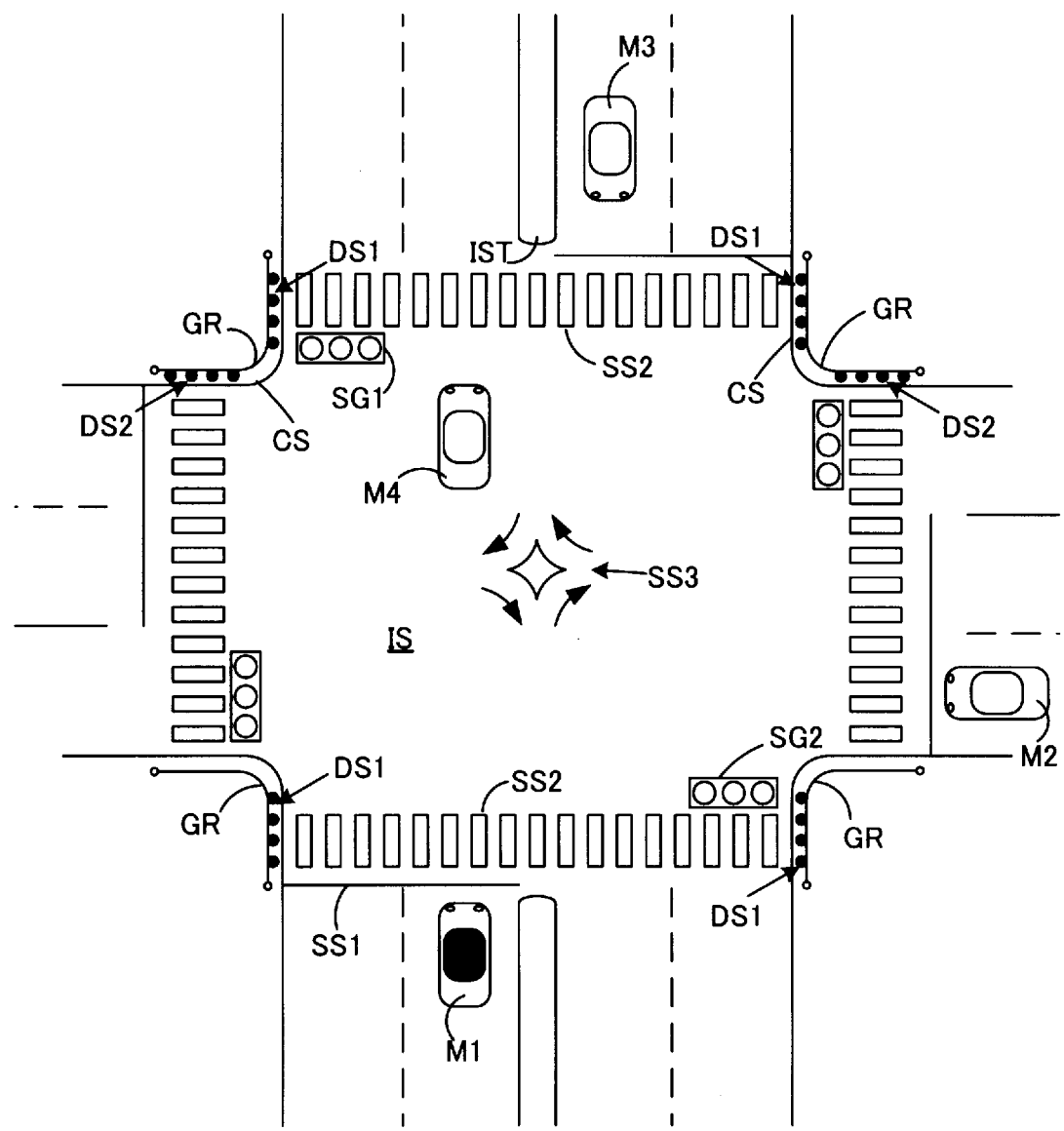
FIG. 4 is an explanatory diagram schematically showing an exemplary intersection environment in execution of an intersection braking assistance process in the first embodiment.

With reference to FIG. 4, a dot sequence DS1 discontinues at some midpoints with constant intervals in a direction parallel to a proceeding direction of the host vehicle, and a dot sequence DS2 discontinues at some midpoints with constant intervals in a direction orthogonal to the proceeding direction of the host vehicle. For example, if these dot sequences DS1, DS2, each of which is assumed to indicate a guardrail GR or a curb stone CS as an object, can be observed, the host vehicle can be determined to be about to be entering or have been entering the intersection.

Moreover, the CPU 101 uses image data inputted from the monocular camera 22 to identify the shape of the intersection, the presence or absence of signal lights, road markings, and road signs, and determines whether the host vehicle is in a state of being entering the intersection. The CPU 101 executes an edge extraction process on the image data inputted from the monocular camera 22, pattern matching with the shape of each object prepared in advance, and matching with the color of each object prepared in advance, to thereby determine a visual shape of each target object. Examples of the road markings include crosswalks, vehicle stop lines, intersection markings, and course markings. Examples of the road signs include intersection signs, guide signs, and traffic signs.

If using a detection signal inputted from at least one of the yaw rate sensor 23 and the steering angle sensor 25 to find that the traveling track of the host vehicle draws a steady turning track having a certain curvature or less, the CPU 101 may further determine that the host vehicle is proceeding in the intersection. More specifically, if the host vehicle has a velocity and a turning curvature that respectively fall within predetermined ranges, and the turning curvature and a steering angle do not vary significantly, the CPU 101 may determine that the host vehicle is proceeding in the intersection.

As shown in FIG. 4, when the host vehicle M1 travels toward and approaches the intersection IS, image data from the monocular camera 22 is used to identify the presence or absence of a vehicle stop line SS1, a crosswalk SS2, an intersection marking SS3, and signal lights SG1, SG2 as well as light colors of the signal lights SG1, SG2. In addition, detection signals from the millimeter wave radars 21, 21s are used to identify the presence or absence of guardrails GR, curb stones CS, and end portions of median strips IST, and also identify an arrangement pattern of the guardrails GR, the curb stones CS, and the end portions of the median strips IST. Note that the intersection IS is not limited to a four-way intersection, and may also be a three- or at least five-way intersection.

If determining that the host vehicle M1 is entering the intersection IS based on at least one of the detection signals and image data from the millimeter wave radars 21, 21s and the monocular camera 22 (step S100: Yes), the CPU 101 sets an intersection entry flag IF to on (IF=1) (step S110), The intersection entry flag IF indicates that the host vehicle M1 is in the intersection IS. The CPU 101 waits until the host vehicle M1 has left the intersection IS (step S120: No). If the host vehicle M1 has left the intersection IS (step S120: Yes), the CPU 101 sets the intersection entry flag IF to off (IF=0) (step S130), and terminates the present processing routine. Regarding the determination as to whether the host vehicle M1 has left the intersection IS, for example, if the above-mentioned shape of the intersection no longer exists in the detection signal from the millimeter radar 21, or if the shape of the intersection, the signal lights, the road markings, and the road signs, which are mentioned above, no longer exist in the image data from the monocular camera 22, the CPU 101 can determine that the host vehicle M1 has left the intersection IS. Furthermore, if a travel distance of the host vehicle M1 after the entry into the intersection IS, which is calculated using the detection signals outputted from the wheel velocity sensors 24, exceeds an intra-intersection distance prepared in advance, or if the detection signal outputted from the steering angle sensor 25 indicates a steering angle corresponding to straight traveling, the CPU 101 may determine that the host vehicle M1 has left the intersection IS.

On the other hand, if determining that the host vehicle M1 has not entered the intersection IS (step S100: No), the CPU 101 sets the intersection entry flag IF to off (IF=0) (step S130) and terminates the present processing routine.

Figure 5:
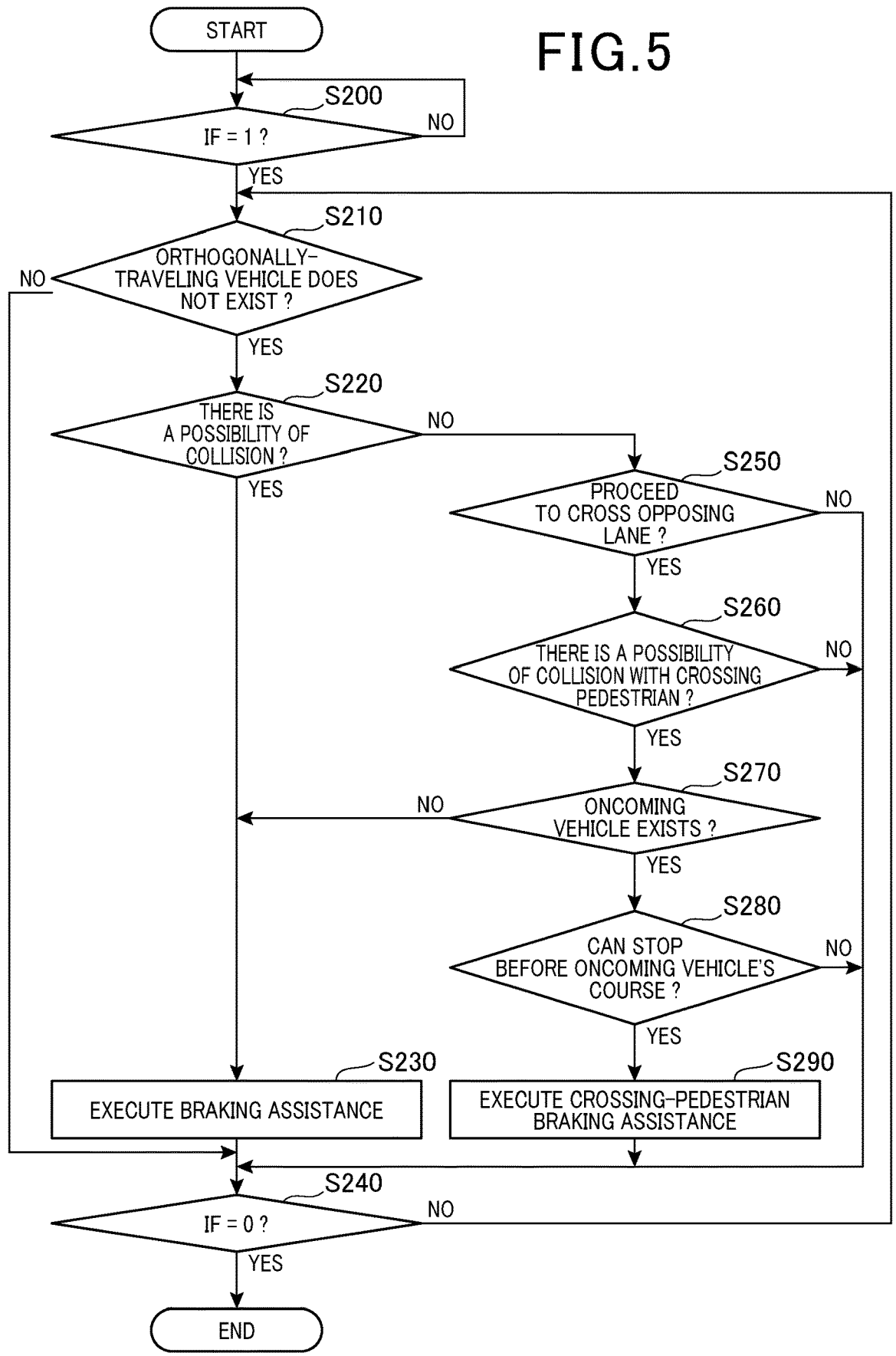
FIG. 5 is a flowchart showing a process flow of the intersection braking assistance process executed by the braking assistance device according to the first embodiment.

A braking assistance process at entry into an intersection executed by the braking assistance device 10 according to the first embodiment will be described with reference to FIGS. 4 and 5. The CPU 101 executes the braking assistance program P2 to thereby execute the processing routine shown in FIG. 5. The braking assistance program P2 is designed to execute, in accordance with a traffic environment of an intersection IS, braking assistance for the host vehicle M1 that is entering the intersection IS. The braking assistance program P2 may be implemented as an extended program of a normal braking assistance program executed outside the intersection, or may be implemented as a program separate from the normal braking assistance program. The braking assistance program P2 is repeatedly executed at predetermined time intervals, from startup to stop of the control system of the vehicle, or from turn-on to turn-off of the start switch, for example.

The CPU 101 determines whether the intersection entry flag IF=1 (step S200). If the intersection entry flag IF=0 (step S200: No), the CPU 101 waits. If the intersection entry flag IF=1 (step S200: Yes), the CPU 101 executes braking assistance in accordance with a traffic environment of the intersection IS, as follows. Notably, examples of the traffic environment of the intersection IS in the first embodiment include the presence or absence of an orthogonally-traveling vehicle M2 relative to the host vehicle M1, the presence or absence of turning of the host vehicle M1, light information on the signal lights SG1, SG2, the presence or absence of a crossing pedestrian PD in a turning direction of the host vehicle M1, and the presence or absence of a possibility of contact of the host vehicle M1 with an oncoming vehicle M3. Moreover, the braking assistance in accordance with the traffic environment of the intersection IS refers to braking assistance in accordance with the presence or absence of a possibility of collision with objects including another vehicle and a crossing pedestrian, which are indicated by these traffic environments.

The CPU 101 determines whether the orthogonally-traveling vehicle M2 does not exist (step S210). That is, the CPU 101 determines whether the traffic environment indicates a possibility that the braking assistance will result in collision with the orthogonally-traveling vehicle M2, i.e., another vehicle. As shown in FIG. 4, the orthogonally-traveling vehicle M2 means a vehicle that is entering the intersection IS orthogonally relative to the host vehicle M1. The CPU 101 uses the detection signals inputted from the millimeter wave radars 21s disposed at the front side surfaces of the host vehicle to determine the presence or absence of the orthogonally-traveling vehicle M2 at and immediately after the entry into the intersection IS. Moreover, proceeding direction the CPU 101 may determine that the orthogonally-traveling vehicle M2 does not exist when determining, based on image data inputted from the monocular camera 22, that each of the signal lights SG1, SG2 located in the straight proceeding direction indicates a green signal (green light) or an arrow signal that permits traveling.

Notably, acquisition of only the light information on any one of the signal lights SG1, SG2 is needed. Alternatively, the CPU 101 may determine the presence or absence of the orthogonally-traveling vehicle M2 by using both of the detection signals from the millimeter wave radars 21s and the image data from the monocular camera 22. With use of both of them, the presence or absence of the orthogonally-traveling vehicle can be determined with higher accuracy.

If not determining that the orthogonally-traveling vehicle M2 does not exist, i.e., determining that the orthogonally-traveling vehicle M2 exists (step 210: No), the CPU 101 determines whether the traffic environment indicates a possibility that the braking assistance will result in collision with the orthogonally-traveling vehicle M2, terminates the present processing routine without executing the braking assistance process, and moves to step S240.

In a traffic environment in which the orthogonally-traveling vehicle M2 exists when the host vehicle M1 is entering the intersection, if braking assistance for avoiding collision with a preceding vehicle M4 were executed in the intersection, for example, there would be a possibility that a decrease in velocity or stop of the host vehicle M1 would result in collision with the orthogonally-traveling vehicle M2. Therefore, in the traffic environment in which the orthogonally-traveling vehicle M2 exists, the braking assistance in the intersection is not executed. Notably, the orthogonally-traveling vehicle M2 means a vehicle that is proceeding toward the intersection IS on a road intersecting a traveling road of the host vehicle.

If determining that the orthogonally-traveling vehicle M2 does not exist (step S210: Yes), the CPU 101 determines that the traffic environment indicates that the braking assistance will avoid collision between the host vehicle M1 and the orthogonally-traveling vehicle M2. The CPU 101 determines whether the host vehicle M1 may collide with another vehicle such as the oncoming vehicle M3 and the preceding vehicle M4, or with an object such as a pedestrian or a bicycle (step S220), and executes braking assistance in accordance with a sensing result from the object sensing unit. Specifically, the CPU 101 uses the detection signals and image data inputted from the millimeter wave radars 21, 21s and the monocular camera 22 to calculate a distance and a relative velocity between the host vehicle M1 and each of the objects, and determines whether there is a possibility of collision if the host vehicle M1 travels without deceleration.

If determining that there is a possibility of collision with an object (step S220: Yes), the CPU 101 executes the braking assistance process (step S230). The CPU 101 decides an amount of braking assistance based on the distance and the relative velocity between the host vehicle M1 and the object, and an amount of the braking pedal operation by an operator. About the amount of the braking pedal operation by the operator, a pressed amount of the braking pedal can be acquired by using detection signals from a stroke sensor provided at a braking pedal and a brake fluid pressure sensor provided at the braking line 503.

The CPU 101 uses the distance and the relative velocity between the host vehicle M1 and the object to decide a braking amount required for avoiding collision. The CPU 101 uses a value obtained by subtracting the amount of the braking pedal operation by the operator from the decided braking amount, as the amount of braking assistance. The CPU 101 transmits a control signal to the braking assistance actuator 30 such that the braking assistance actuator 30 implements the decided amount of braking assistance. The braking assistance actuator 30, which has received the control signal, applies fluid pressure that implements the decided amount of braking assistance to the braking line 503.

When transmitting the control signal to the braking assistance actuator 30, the CPU 101 determines whether the intersection entry flag IF=0 (step S240), i.e., whether the host vehicle M1 has left the intersection IS. If the host vehicle M1 still remains in the intersection IS (IF=1) (step S240: No), the CPU 101 moves to step S210 and continues the braking assistance process. If the host vehicle M1 has left the intersection IS (IF=0) (step S240: Yes), the CPU 101 terminates the present processing routine.

Figure 7:
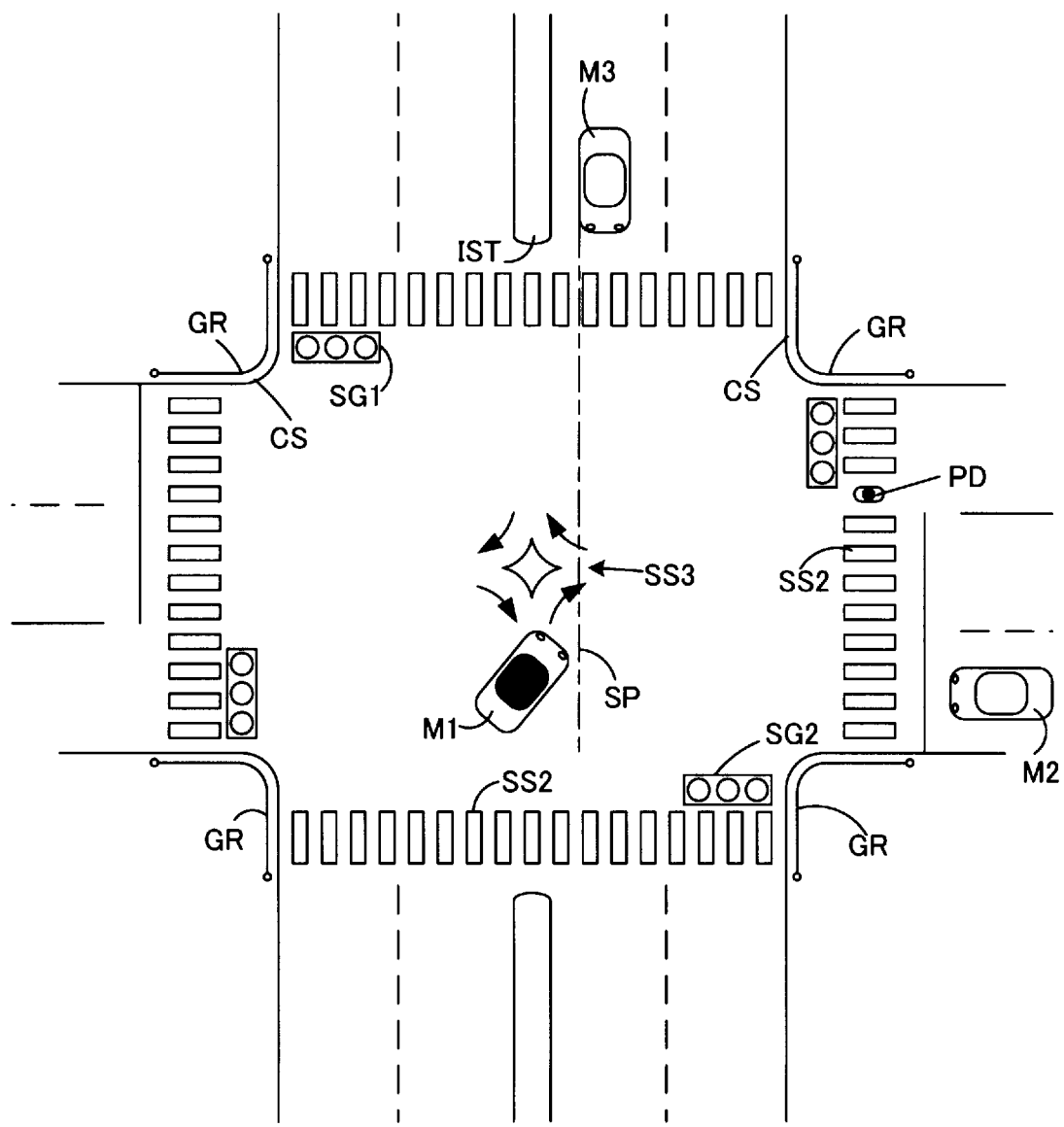
FIG. 7 is an explanatory diagram schematically showing an exemplary intersection environment in execution of the determination process as to whether a host vehicle can stop before an oncoming vehicle's course in the first embodiment.

If determining that there is no possibility of collision at step S220 (S220: No), the CPU 101 determines whether the host vehicle M1, as shown in FIG. 7, is traveling to cross, i.e., to turn, the opposing lane (step S250). This determination is as to whether to turn right in the case of left-hand traffic, and whether to turn left in the case of right-hand traffic. Notably, for simplicity's sake, the description will hereinafter be made by turning right in left-hand traffic as an example. As has already been mentioned, the determination at step S250 is made based on whether using the detection signal inputted from at least one of the yaw rate sensor 23 and the steering angle sensor 25 to find the traveling track of the host vehicle draws a steady turning track having a certain curvature or less.

If determining that the host vehicle M1 is not crossing the opposing lane (step S250: No), the CPU 101 moves to step S240. If determining that the host vehicle M1 is crossing the opposing lane (step S250: Yes), the CPU 101 determines whether the traffic environment indicates a possibility of collision with a crossing pedestrian PD (step S260). In other words, as shown in FIG. 7, it is determined whether a crossing pedestrian PD exists in the crosswalk after the right turn or a crossing bicycle exists on the road after the right turn. If using the detection signals from the millimeter wave radars 21, 21s to find that an object exists in a right region relative to the host vehicle M1 and a distance between the object and the host vehicle M1 decreases, the CPU 101 determines that there is a crossing pedestrian PD. Notably, the crossing pedestrian PD conceptually includes a crossing pedestrian as well as a crossing bicycle. Alternatively, if observing, in the image data from the monocular camera 22, a crossing pedestrian PD in the proceeding direction of the host vehicle M1, the CPU 101 determines that the crossing pedestrian PD exists. The CPU 101 may use both of the detection signals from the millimeter wave radars 21, 21s and the image data from the monocular camera 22.

If determining that there is a possibility of collision with the crossing pedestrian PD (step S260: Yes), the CPU 101 determines whether an oncoming vehicle M3 exists (step S270). The oncoming vehicle M3 means a vehicle that is proceeding in a direction opposed to that of the host vehicle M1. The determination of the presence or absence of the oncoming vehicle M3 is made using at least one of the detection signals from the millimeter wave radars 21, 21s, mainly from the millimeter wave radar 21, and the image data from the monocular camera 22. Notably, if a turn-right signal is observed in the image data from the monocular camera 22, the CPU 101 may determine that the oncoming vehicle M3 does not exist. If determining that the oncoming vehicle M3 does not exist, the CPU 101 moves to step S230, and executes braking assistance for avoiding collision with the object to thereby avoid collision with the crossing pedestrian PD. If determining that the oncoming vehicle M3 exists (step S270: Yes), the CPU 101 determines whether the host vehicle M1 can stop before the course of the oncoming vehicle M3, based on a stop-before-oncoming-vehicle's-course flag OF (step S280). In other words, it is determined whether the host vehicle M1 can stop without crossing a before-oncoming-vehicle's-course stop line SP shown in FIG. 7 by alternate long and short dashed lines.

If determining that the traffic environment indicates that the host vehicle M1 can stop before the oncoming vehicle's course, i.e., the stop-before-oncoming-vehicle's-course flag OF=1 (step S280: Yes), the CPU 101 executes crossing-pedestrian braking assistance (step S290), and moves to step S240. In the crossing-pedestrian braking assistance, the CPU 101 decides an amount of braking assistance such that the host vehicle M1 stops on or before the before-oncoming-vehicle's-course stop line SP. This amount of braking assistance is decided by using a distance D1 from the host vehicle M1 to the before-oncoming-vehicle's-course stop line SP, the velocity v of the host vehicle M1, and the pressed amount of the braking pedal by the operator, such that v=0 at least at the before-oncoming-vehicle's-course stop line SR The CPU 101 transmits a control signal to the braking assistance actuator 30 such that the decided amount of braking assistance is implemented. The braking assistance actuator 30, which has received the control signal, applies fluid pressure that implements the decided amount of braking assistance to the braking line 503. Consequently, the host vehicle M1 stops at the before-oncoming-vehicle's-course stop line SP shown in FIG. 7, so that collision with the crossing pedestrian PD as well as the oncoming vehicle M3 can be avoided.

If determining that the traffic environment indicates that the host vehicle M1 cannot stop before the oncoming vehicle's course, i.e., the stop-behind-oncoming-vehicle's-course flag OF=0 (step S280: No), the CPU 101 moves to step S240. In this case, there is a possibility that execution of the crossing-pedestrian-support braking assistance accompanied by the stop of the host vehicle M1 in the vicinity of a central portion of the intersection IS, or execution of the braking assistance for avoiding collision with the crossing pedestrian PD accompanied by the stop of the host vehicle M1 in the vicinity of the crosswalk, would invite collision with the oncoming vehicle M3. Therefore, the braking assistance process in the intersection IS is not executed. Notably, collision with the crossing pedestrian PD can be avoided by the executing a breaking operation by the operator as appropriate, while avoiding collision with the oncoming vehicle M3, or by the braking assistance process for avoiding collision with the object being executed after the host vehicle M1 leaves the intersection IS.

Figure 6:
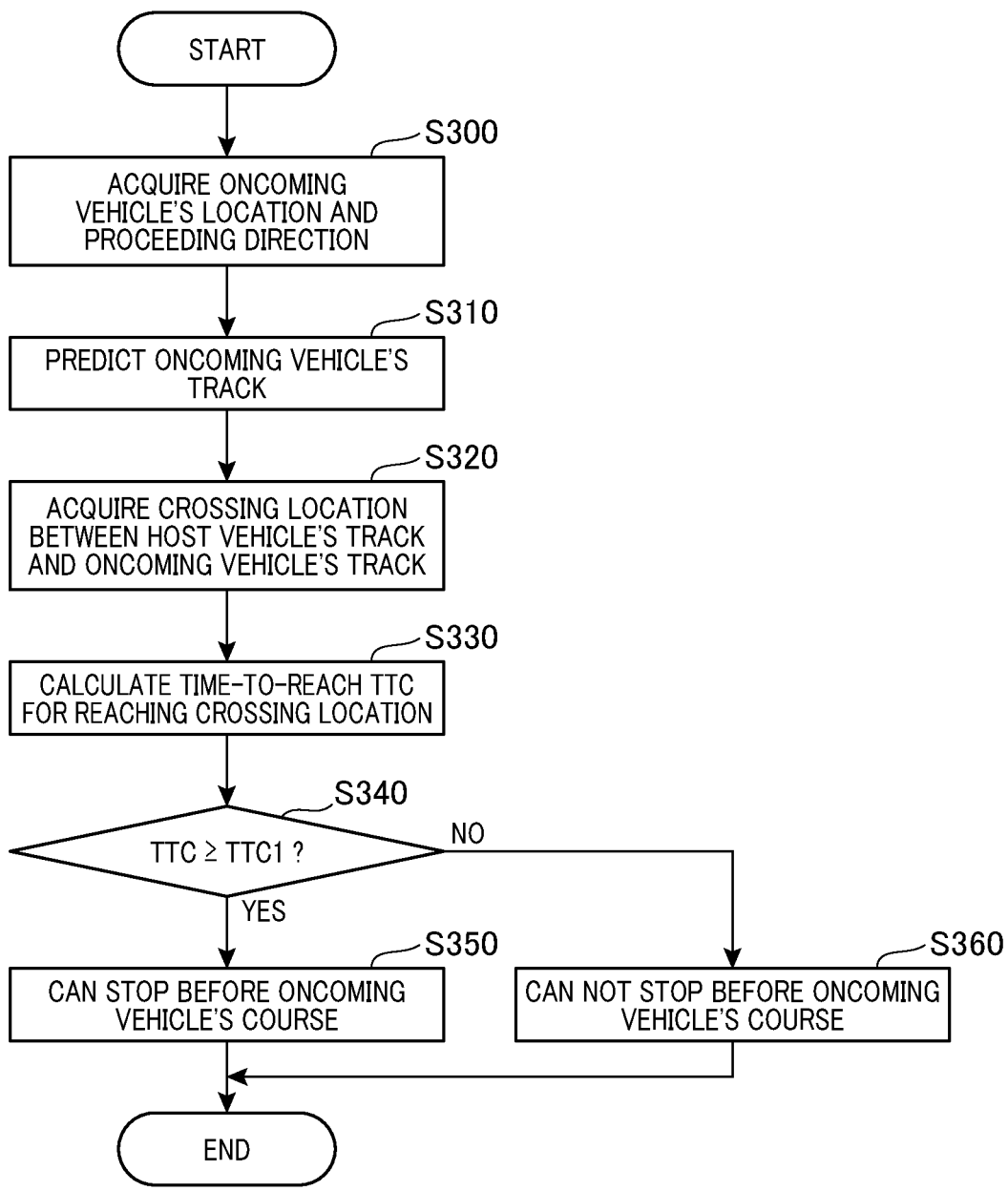
FIG. 6 is a flowchart showing a process flow of a determination process as to whether a host vehicle can stop before an oncoming vehicle's course, executed by the braking assistance device according to the first embodiment.
Figure 8:
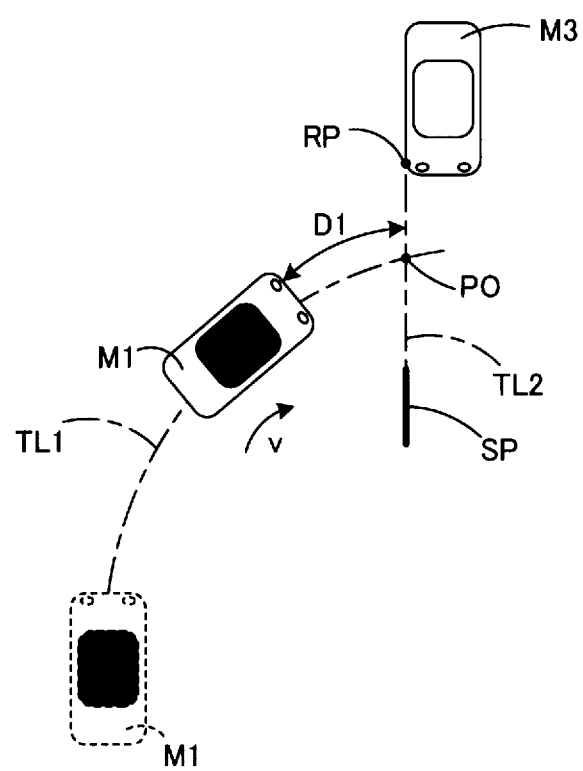
FIG. 8 is an explanatory diagram schematically showing a relation between a host vehicle and an oncoming vehicle in execution of the determination process as to whether the host vehicle can stop before the oncoming vehicle's course in the first embodiment.

With use of FIGS. 6 and 8, detailed description will be made of a determination process as to whether the stop before the oncoming vehicle's course is enabled. The process step shown in FIG. 6 may be executed simultaneously with the process step shown in FIG. 5 by the CPU 101's executing the braking assistance program P2, or may be started at a timing when the CPU 101 determines that the host vehicle M1 turns right at the intersection IS (step S250: Yes). The CPU 101 acquires a location and a proceeding direction of the oncoming vehicle M3 (step S300). The CPU 101 uses sensing signals from the millimeter wave radars 21, 21s to acquire a current location of the oncoming vehicle M3, and additionally, calculates a straight traveling velocity and a lateral velocity to calculate a proceeding direction of the oncoming vehicle M3. Specifically, a straight traveling velocity vector and a lateral velocity vector that originate from a coordinate point indicating the current location of the oncoming vehicle M3 are combined into a resultant vector. A direction indicated by the resultant vector is used as the proceeding direction.

The CPU 101 predicts a track of the oncoming vehicle M3 (step S310). Specifically, as shown in FIG. 8, the CPU 101 obtains a linear equation that represents a track TL2. The track TL2 originates from the right-leading-edge coordinates RP of the oncoming vehicle M3, and extends in the proceeding direction of the oncoming vehicle M3. The track TL2 of the oncoming vehicle M3 can also be a track extending from the nearest contact point of the oncoming vehicle M3 with the host vehicle M1. Notably, if a detection point indicated by the millimeter wave radars 21, 21s takes coordinate values indicating the center of the object, these coordinate values are corrected by using coordinate a value from the center to the right end of the vehicle, this coordinate value being prepared in advance, to obtain the right-leading-edge coordinates of the oncoming vehicle M3. Alternatively, if a stereo camera is used, pixel blocks indicating the oncoming vehicle M3 in the image data are used to obtain the right-leading-edge coordinates thereof.

The CPU 101 acquires a crossing location PO between a track TL1 of the host vehicle M1 and the track TL2 of the oncoming vehicle M3 (step S320). The track TL1 of the host vehicle M1 is acquired, for example, by: calculating a velocity v (km/h) of the host vehicle based on a wheel velocity inputted from the wheel velocity sensors 24; using an angular velocity ω inputted from the yaw rate sensor 23 and the calculated velocity v to obtain a radius r of curvature from a relation of v=rω; and obtaining a curve equation indicating a circular arc having the radius r, which circular arc originates from current coordinates of the host vehicle M1. The CPU 101 obtains intersection coordinates between the linear equation and the curve equation, to thereby acquire the crossing location PO between the track TL1 of the host vehicle M1 and the track TL2 of the oncoming vehicle M3. Notably, a steering angle sensed by the steering angle sensor 25 may be used in place of the detection signal from the yaw rate sensor 23 to obtain the curve equation indicating the track of the host vehicle M1.

The CPU 101 calculates a time-to-reach TTC(s) for the host vehicle M1 to reach the obtained crossing location (step S330). The CPU 101 calculates the time-to-reach TTC from an equation of TTC=DL/v, by using a velocity v of the host vehicle M1 and a distance D1(m) to the intersection point. The CPU 101 determines whether the calculated time-to-reach TTC is equal to or larger than a predetermined determination value TTC1, i.e., TTC≥TTC1 (step S340). The determination value TTC1 refers to a time during which the host vehicle M1 can stop on or before the before-oncoming-vehicle's-course stop line SP. For example, a plurality of the determination values that increases in value in accordance with the velocity v of the host vehicle M1 may be prepared.

If determining that TTC≥TTC1 (step S340: Yes), the CPU 101 determines that the host vehicle M1 can stop at the before-oncoming-vehicle's-course stop line SP, sets the stop-before-oncoming-vehicle's-course flag OF to on (OF=1), and terminates the present processing routine. If determining that TTC<TTC1 (step S340: No), the CPU 101 determines that the host vehicle M1 cannot stop at the before-oncoming-vehicle's-course stop line SP, sets the stop-before-oncoming-vehicle's-course flag OF to off (OF=0) (step S360), and terminates the present processing routine.

The braking assistance device 10 and the braking assistance method executed by the braking assistance device 10 according to the first embodiment, as described above, can control execution of the braking assistance in accordance with the traffic environment at the intersection IS, if the host vehicle M1 is entering or is currently in the intersection IS. In other words, if the traffic environment at the intersection IS indicates a possibility that execution of the braking assistance would invite collision with another vehicle, for example, if there is a possibility that the braking assistance for avoiding collision with the preceding vehicle M4 in the intersection IS would invite collision with the orthogonally-traveling vehicle M2, the braking assistance device 10 does not execute the braking assistance for avoiding the collision with the preceding vehicle M4, to thereby avoid collision with the orthogonally-traveling vehicle M2. Moreover, when the host vehicle M1 crosses the opposing lane, for example, and if there is a possibility thereafter that the braking assistance for avoiding collision with the crossing pedestrian PD would invite collision with the oncoming vehicle M3, then the braking assistance device 10 does not execute the braking assistance for simply stopping the host vehicle M1 in the intersection IS, to thereby avoid collision with the oncoming vehicle M3. In this example, braking assistance can be executed from a viewpoint of avoiding collision with both of the oncoming vehicle M3 and the crossing pedestrian PD when the host vehicle M1 crosses the intersection IS, which viewpoint has not yet been fully considered conventionally.

Second Embodiment

In the first embodiment, description has been made of the aspect in which braking assistance is not executed in accordance with the traffic environment of the intersection IS. A second embodiment executes braking assistance in different nodes in accordance with a traffic environment that can be observed. For example, the second embodiment executes braking assistance while changing a level, i.e. an amount, of the braking assistance in addition to no execution of the braking assistance. The environment of the intersection IS in the second embodiment includes the presence or absence of the orthogonally-traveling vehicle M2 relative to the host vehicle M1, the presence or absence of turning of the host vehicle M1, the presence or absence of a crossing pedestrian in a turning direction of the host vehicle M1, and additionally, for example, the presence or absence of the oncoming vehicle M3, the shape of the intersection, and a color of each signal light.

(1) In braking assistance in the intersection IS, in order to avoid collision with the orthogonally-traveling and oncoming vehicles M2, M3, caused by the host vehicle M1's stop in the intersection IS, at least one of reduction in time for the braking assistance and reduction in amount of the braking assistance may be executed. The reduction in time for the braking assistance means reduction in time during which brake fluid pressure is increased by the braking assistance actuator 30. The reduction in amount of the braking assistance means reduction in amount by which brake fluid pressure is increased by the braking assistance actuator 30. In any case, braking of the host vehicle M1 can be implemented by braking assistance, on the one hand, and stop of the host vehicle M1 in the intersection IS can be avoided, or a stop timing can be delayed, i.e., a stop position can be shifted forward by the braking assistance, on the other hand. Notably, this control on the braking assistance is executed on a condition (i) that the presence or absence of the orthogonally-traveling vehicle M2 has been confirmed, a condition (ii) that colors of the signal lights SG1, SG2 in the proceeding direction have been confirmed, and a condition (iii) that the presence or absence of the oncoming vehicle M3 has been confirmed. If these three conditions have been satisfied, collision with the orthogonally-traveling and oncoming vehicles M2, M3 can be avoided. However, if the host vehicle M1 remains in the intersection IS, there still remains a possibility of collision between the host vehicle M1 and each of the orthogonally-traveling and oncoming vehicles M2, M3, depending on their behaviors. Therefore, the host vehicle M1 is ensured not to stop in the intersection IS, to thereby be able to lower the possibility of further collision.

(2) Furthermore, in accordance with the condition(s) that has been confirmed among the above three conditions, the level of the braking assistance may be modified as follows.

(2.1) If only the conditions (ii) and (iii) have been confirmed, further reduction in at least any one of the time for braking assistance and the amount of braking assistance may be executed. In this case, light of the signal lights SG1, SG2 has been observed, so that a green signal or a turn-right signal for the host vehicle M1 has been confirmed, for example, but the presence or absence of the orthogonally-traveling vehicle M2 has not been confirmed. Therefore, avoiding stop or delaying a stop timing for the host vehicle M1 in the intersection IS by braking assistance can avoid unexpected collision with the orthogonally-traveling vehicle M2, the presence or absence of which has not been confirmed.

(2.2) If only the condition (iii) has been confirmed, braking assistance intended for stop is not executed, but slow braking intended for velocity reduction is executed. The slow braking is executed by, for example, implementing such brake fluid pressure as to make a braking pad lightly abut against a braking disc via the braking assistance actuator 30. In this case, since light of the signal lights SG1, SG2 has not been observed, a possibility of collision with the orthogonally-traveling vehicle M2 is higher than that in the case (2.1). Therefore, the braking assistance intended for stop is not executed, to thereby further avoid unexpected collision with the orthogonally-traveling vehicle M2.

(2.3) If none of the above three conditions has been confirmed, braking assistance in the intersection IS is not executed. This can avoid unexpected collision with the orthogonally-traveling vehicle M2 as well as the oncoming vehicle M3. Notably, whether the above three conditions have been confirmed includes the case where the three conditions have not been sensed by the provided object sensing unit, due to a traveling state of the host vehicle M1, as well as the case where only the limited condition(s) can be sensed by the provided object sensing unit. In this case, braking assistance can be executed in the above-described different modes, depending on a type of the object sensing unit provided at the host vehicle M1.

Third Embodiment

In the first embodiment, if determining that there is a possibility of collision with the oncoming vehicle M3 at step S220, the CPU 101 executes braking assistance at step S230. In a third embodiment, the CPU 101 not only senses the presence of the oncoming vehicle M3, but also considers light of the signal lights SG1, SG2 at step S220. Specifically, if the light of the signal lights SG1, SG2 indicates a turn-right permission signal, the CPU 101 delays the timing of execution of the braking assistance at step S230. While the turn-right permission signal is lit, the oncoming vehicle M3 is assumed to stop before entering the intersection IS. Therefore, delaying the braking assistance executed at a normal timing can mitigate or remove a sense of discomfort caused by braking that is accompanied by braking assistance possibly being highly unnecessary and that is not intended by the operator.

Variations (1) In the first to third embodiments, the entry into the intersection is determined using sensing signals or image data from the millimeter wave radars 21, 21s, the monocular camera 22, or a LIDAR and a stereo camera, which serve as the object sensing unit. In contrast to this, the entry into the intersection may be determined using information from an optical beacon and map information in a global positioning system (GPS) and a navigation system. Moreover, if a sophisticated optical beacon is available, information on a signal light color is acquired via the optical beacon to thereby determine the signal light color. In this case, even only with the object sensing unit that does not acquire image data, such as the millimeter wave radars 21, 21s or a LIDAR, the traffic environment can be determined as in the case with a camera.

(2) In the first to third embodiments, description has been made by taking an example that includes the two object sensing units, i.e., the millimeter wave radars 21, 21s, and the monocular camera 22. However, only at least one object sensing unit, such as only the millimeter wave radars 21, 21s or only the monocular camera 22, needs to be included. If only the millimeter wave radars 21, 21s are included, light information on the signal lights SG1, SG2 cannot be acquired. Therefore, the braking assistance designed for the case where light information on the signal lights SG1, SG2 cannot be observed, as described in the second embodiment, is executed. Moreover, if only the monocular camera 22 is included, light information on the signal lights SG1, SG2 is utilized to execute the braking assistance, as described in the third embodiment. In this case, since the light information on the signal lights SG1, SG2 can be utilized, the presence or absence of the orthogonally-traveling vehicle M2 can be determined indirectly. Furthermore, if only a stereo camera is included, braking assistance similar to that in the case where the millimeter wave radars 21, 21s and the monocular camera 22 are included can be executed.

(3) In the first to third embodiments, the CPU 101 executes the intersection entry determination program P1 and the braking assistance program P2, to thereby implement the intersection entry determination unit and the braking assistance execution unit in software. However, these units may be implemented in hardware by an integrated circuit or a discrete circuit programmed in advance.

The present disclosure has been described based on the embodiments and variations. The above-described embodiments of the invention, however, are intended to facilitate understanding of the present disclosure, and do not limit the present disclosure. The present disclosure can be modified and improved without departing from its gist and the scope of the claims, and additionally, includes equivalents thereof. For example, the technological features in the embodiments and the variations, respectively corresponding to the technological features in the aspects described in the section of Summary of the Invention, can be replaced or combined as appropriate, so as to solve some or all of the above-mentioned problems or achieve some or all of the above-mentioned effects. Moreover, if the technological features are not described as essential in the present specification, these features can be deleted as appropriate. For example, the braking assistance device for the vehicle, according to the first aspect described above, is set as application 1.

(1) Application 2: in the braking assistance device for the vehicle according to application 1, if the determined traffic environment indicates a possibility that the braking assistance would invite collision with another vehicle, the braking assistance execution ay not execute the braking assistance.

(2) Application 3: in the braking assistance device for the vehicle according to application 2, if an orthogonally-traveling vehicle that orthogonally travels relative to the host vehicle exists, the braking assistance execution unit may determine that the traffic environment indicates a possibility that the braking assistance would invite collision with the other vehicle.

(3) Application 4: in the braking assistance device for the vehicle according to any one of applications 1 to 3, if the determined traffic environment does not indicate a possibility that the braking assistance would invite collision with another vehicle, the braking assistance execution unit may execute the braking assistance in accordance with the sensing result.

(4) Application 5: in the braking assistance device for the vehicle according to application 4, if an orthogonally-traveling vehicle that orthogonally travels relative to the host vehicle does not exist, the braking assistance execution unit may determine that the traffic environment does not indicate a possibility that the braking assistance would invite collision with the other vehicle.

(5) Application 6: in the braking assistance device for the vehicle according to application 5, if a signal light in a proceeding direction of the host vehicle is at green, the braking assistance execution unit may determine that the orthogonally-traveling vehicle relative to the host vehicle does not exist.

(6) Application 7: in the braking assistance device for the vehicle according to any one of applications 4 to 6, if further determining that the traffic environment is such that the host vehicle crosses an opposing lane, has a possibility of collision with an intersection-crossing pedestrian, and can stop without coming into contact with an oncoming vehicle, the braking assistance execution unit may execute crossing-pedestrian-support braking assistance as the braking assistance.

(7) Application 8: in the braking assistance device for the vehicle according to application 7, the crossing-pedestrian-support braking assistance may be braking assistance that implements braking to stop the host vehicle at a location in the intersection where the host vehicle is not in contact with the oncoming vehicle.

(8) Application 9: in the braking assistance device for the vehicle according to any one of applications 4 to 8, the braking assistance execution unit may execute the braking assistance in a different aspect, in accordance with at least one of a type of the object sensing unit provided at the host vehicle and the determined intersection environment.

(9) Application 10: in the braking assistance device for the vehicle according to any one of applications 1 to 9, the intersection entry determination unit may determine that the host vehicle enters the intersection by using at least one of a shape of the intersection, presence or absence of a signal light, a road marking, a road sign, and a traveling track of the host vehicle.

The invention claimed is:

1. A braking assistance device for a vehicle, comprising:
an object sensing unit configured to sense objects around a host vehicle;
an intersection entry determination unit configured to determine entry of the host vehicle into an intersection of a traveling road of the host vehicle; and
a braking assistance execution unit configured to:
execute braking assistance using a braking device of the host vehicle so as to avoid or mitigate colliding with an object;
determine, based on a sensing result from the object sensing unit, a traffic environment at the intersection for a state in which the host vehicle is determined to be entering the intersection;
determine, based on the determined traffic environment at the intersection, whether the braking assistance to avoid or mitigate colliding with the object indicates a possibility that the braking assistance will result in colliding with an orthogonally-traveling vehicle that travels orthogonally relative to the host vehicle; and
control execution of the braking assistance in accordance with the determined traffic environment, wherein
the braking assistance execution unit does not execute the braking assistance to avoid or mitigate colliding with the object in response to the determined traffic environment at the intersection indicating the possibility that the braking assistance to avoid or mitigate colliding with the object will result in colliding with the orthogonally-traveling vehicle.

2. The braking assistance device for the vehicle according to claim 1, wherein
for a state in which the determined traffic environment indicates no possibility of the braking assistance will result in colliding with the orthogonally-traveling vehicle, the braking assistance execution unit executes the braking assistance in accordance with the sensing result.

3. The braking assistance device for the vehicle according to claim 2, wherein
for a state in which no orthogonally-traveling vehicle that orthogonally travels relative to the host vehicle exists, the braking assistance execution unit determines that the traffic environment indicates no possibility of the braking assistance will result in colliding with the orthogonally-traveling vehicle.

4. The braking assistance device for the vehicle according to claim 3, wherein
for a state in which a signal light in a proceeding direction of the host vehicle is green, the braking assistance execution unit determines that no orthogonally-traveling vehicle relative to the host vehicle exists.

5. The braking assistance device for the vehicle according to claim 2, wherein
the braking assistance execution unit executes crossing-pedestrian braking assistance for a state in which the braking assistance execution unit determines that the traffic environment is such that the host vehicle crosses an opposing lane although there is a possibility of colliding with an intersection-crossing pedestrian.

6. The braking assistance device for the vehicle according to claim 5, wherein
the crossing-pedestrian braking assistance represents braking assistance that implements braking to stop the host vehicle at a location in the intersection where the host vehicle is not in contact with an oncoming vehicle.

7. The braking assistance device for the vehicle according to claim 2, wherein
the braking assistance execution unit executes the braking assistance in different modes in accordance with at least one of:
a type of the object sensing unit provided at the host vehicle; or
the determined traffic environment.

8. The braking assistance device for the vehicle according to claim 1, wherein
the intersection entry determination unit determines entry of the host vehicle into the intersection by using at least one of a shape of the intersection, presence or absence of a signal light, a road marking, a road sign, or a traveling track of the host vehicle.

9. A braking assistance method for a vehicle, comprising:
determining entry of a host vehicle into an intersection of a traveling road of the host vehicle;
determining, based on a sensing result from an object, a traffic environment at the intersection for a state in which the host vehicle is determined to be entering the intersection; and
controlling braking assistance executed by a braking device, so as to avoid or mitigate colliding with the object, in accordance with the sensing result and the determined traffic environment, wherein
the braking assistance to avoid or mitigate colliding with the object is not executed in response to the determined traffic environment at the intersection indicating a possibility that the braking assistance to avoid or mitigate colliding with the object will result in colliding with an orthogonally-traveling vehicle that travels orthogonally relative to the host vehicle.

\* \* \* \* \*